US010158128B2

(12) United States Patent
Zhang et al.

(10) Patent No.: US 10,158,128 B2
(45) Date of Patent: Dec. 18, 2018

(54) FUEL CELL STACK BREAK-IN PROCEDURES AND BREAK-IN CONDITIONING SYSTEMS

(71) Applicant: GM GLOBAL TECHNOLOGY OPERATIONS LLC, Detroit, MI (US)

(72) Inventors: Jingxin Zhang, Novi, MI (US); Nagappan Ramaswamy, Rochester Hills, MI (US); Balasubramanian Lakshmanan, Rochester Hills, MI (US); Swaminatha P. Kumaraguru, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 121 days.

(21) Appl. No.: 15/451,893

(22) Filed: Mar. 7, 2017

(65) Prior Publication Data

US 2018/0261858 A1    Sep. 13, 2018

(51) Int. Cl.
*H01M 8/04* (2016.01)
*H01M 8/04119* (2016.01)
*H01M 8/04828* (2016.01)
*H01M 8/04223* (2016.01)
*H01M 8/04225* (2016.01)
*H01M 8/04302* (2016.01)

(52) U.S. Cl.
CPC ... *H01M 8/04141* (2013.01); *H01M 8/04223* (2013.01); *H01M 8/04225* (2016.02); *H01M 8/04302* (2016.02); *H01M 8/04835* (2013.01)

(58) Field of Classification Search
None
See application file for complete search history.

(56) References Cited

U.S. PATENT DOCUMENTS

| | | | |
|---|---|---|---|
| 6,576,356 B1 | 6/2003 | Hallum | |
| 6,835,477 B1 * | 12/2004 | Brambilla | H01M 8/0258 429/437 |
| 8,043,759 B2 | 10/2011 | Zhang et al. | |
| 8,206,872 B2 | 6/2012 | Brenner et al. | |
| 8,617,770 B2 | 12/2013 | Yan et al. | |
| 8,828,613 B2 | 9/2014 | Zhang et al. | |
| 9,099,703 B2 | 8/2015 | Rapaport et al. | |
| 9,337,494 B2 | 5/2016 | Zhang et al. | |

(Continued)

*Primary Examiner* — Scott J. Chmielecki
(74) *Attorney, Agent, or Firm* — Quinn IP Law (57) ABSTRACT

Disclosed are fuel cell stack break-in procedures, conditioning systems for performing break-in procedures, and motor vehicles with a fuel cell stack conditioned in accordance with disclosed break-in procedures. A break-in method is disclosed for conditioning a membrane assembly of a fuel cell stack. The method includes transmitting humidified hydrogen to the anode of the membrane assembly, and transmitting deionized water to the cathode of the membrane assembly. An electric current and voltage cycle are applied across the fuel cell stack while the fuel cell stack is operated in a hydrogen pumping mode until the fuel cell stack is determined to operate at a predetermined threshold for a fuel cell stack voltage output capability. During hydrogen pumping, the membrane assembly oxidizes the humidified hydrogen, transports protons from the anode to the cathode across the proton conducting membrane, and regenerates the protons in the cathode through a hydrogen evolution reaction.

20 Claims, 3 Drawing Sheets

(56) References Cited

U.S. PATENT DOCUMENTS

| | | | |
|---|---|---|---|
| 2004/0058224 A1* | 3/2004 | Eshraghi | H01M 4/8605 |
| | | | 429/465 |
| 2008/0020262 A1 | 1/2008 | Zhang et al. | |
| 2008/0050640 A1* | 2/2008 | Sun | H01M 4/8652 |
| | | | 502/185 |
| 2011/0195324 A1 | 8/2011 | Zhang et al. | |
| 2015/0180079 A1* | 6/2015 | Leger | H01M 8/004 |
| | | | 429/437 |
| 2015/0357650 A1 | 12/2015 | Lakshmanan et al. | |
| 2017/0058420 A1* | 3/2017 | Goulet | H01M 4/8605 |

* cited by examiner

FUEL CELL STACK BREAK-IN PROCEDURES AND BREAK-IN CONDITIONING SYSTEMS

The present disclosure relates generally to fuel cell systems for converting hydrogen-based chemical energy into electricity. More specifically, aspects of this disclosure relate to fuel cell break-in systems and procedures for proton exchange membrane (PEM) fuel cell stacks.

Current production motor vehicles, such as the modern-day automobile, are originally equipped with a powertrain that operates to propel the vehicle and power the onboard vehicle electronics. The powertrain, which is inclusive of, and oftentimes misclassified as, a vehicle drivetrain, is generally comprised of a prime mover that delivers driving power to the vehicle's final drive system (e.g., differential, axle, and road wheels) through a multi-speed power transmission. Automobiles have generally been powered by a reciprocating-piston type internal combustion engine (ICE) because of its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid and electric vehicles, on the other hand, utilize alternative power sources, such as an electric motor-generator, to propel the vehicle and minimize reliance on an engine for power and, thus, increasing overall fuel economy.

Hybrid electric and full electric vehicle powertrains take on various architectures, some of which utilize a fuel cell stack to supply power for one or more electric traction motors. A fuel cell stack is an electro-chemical device generally composed of an anode that receives hydrogen ($H_2$), a cathode that receives oxygen ($O_2$), and an electrolyte interposed between the anode and cathode. An electrochemical reaction is induced to oxidize hydrogen molecules at the anode to generate free protons ($H^+$), which are then passed through the electrolyte for reduction with an oxidizing agent, such as oxygen, at the cathode. In particular, hydrogen gas is catalytically split in an oxidation half-cell reaction in the anode catalyst layer to generate protons and electrons. These protons pass through the electrolyte to the cathode, where the protons react with oxygen and electrons in the cathode to generate water. Electrons from the anode, however, cannot pass through the electrolyte and, thus, are redirected through a load, such as a motor or battery, before being sent to the cathode.

Fuel cell stack designs commonly employed in automotive applications utilize a solid polymer electrolyte (SPE) membrane or a proton exchange membrane (PEM) to provide ion transport between the anode and cathode. Proton exchange membrane fuel cells (PEMFC) generally employ a solid polymer electrolyte proton conducting membrane, such as a perfluorosulfonic acid membrane. The anode and cathode typically include finely dispersed catalytic particles, such as platinum (Pt), supported on carbon particles and mixed with an ionomer. The catalytic mixture is deposited on the sides of the membrane to form the anode and cathode catalytic layers. The combination of the anode catalytic layer, cathode catalytic layer, and electrolyte membrane define a membrane electrode assembly (MEA) in which the anode catalyst and cathode catalyst are supported on opposite faces of the ion conductive solid polymer membrane.

As part of the manufacture of a PEMFC, each newly assembled fuel cell stack is typically cycled through an incubation period of stack operation to "break-in" the MEAs. During a fuel cell stack break-in procedure, MEAs are conditioned such that the terminal voltage of the stack gradually rises over time to ensure the terminal voltage stabilizes at or near a generally constant peak voltage level. Break-in is oftentimes needed for the MEAs in a newly fabricated fuel cell stack to obtain optimal performance for long-term operation of the stack. The primary function(s) of MEA break-in may include: humidification of the membrane, removal of residual solvents and other impurities resulting from MEA manufacturing, and removal of anions from the catalyst to activate reaction sites. Current procedures for break-in of MEAs in a fuel cell stack may require multiple hours of fuel cell operation for targeting different levels of resulting functionality. In addition, many known break-in procedures require consumption of large volumes of hydrogen and electricity, both of which are costly to supply. Some approaches to fuel cell stack break-in are very intensive, involving high-voltage operations (e.g., in excess of 300 volts (V)) and high fuel cell temperatures, which require increased electrical isolation, large volumes of coolant flow, and expensive equipment.

SUMMARY

Disclosed herein are fuel cell stack break-in procedures, fuel cell conditioning systems for implementing break-in procedures, and motor vehicles with a fuel cell stack conditioned in accordance with disclosed break-in procedures. By way of example, and not limitation, there is presented a novel fuel cell stack break-in procedure that utilizes low-cost test equipment, low-temperature operation, and low-voltage operation using water and reclaimed hydrogen. In this example, PEM fuel cell stack break-in may be realized by running the stack in a "hydrogen pumping mode" wherein humidified $H_2$ is fed to the anode and deionized water (liquid or vapor), rather than air or concentrated oxygen, is fed to the cathode. A fuel cell, when operated as an electrochemical hydrogen pump, produces a relatively pure hydrogen flow at a cathode exhaust of the cell relative to an incoming flow that is received at an anode inlet of the cell. A power source, such as an electronic potentiostat, may be used to impose a positive current across each cell or the entire stack, e.g., in the range of approximately 0.05 to 1.5 amps per square centimeter ($A/cm^2$), whereas cell voltage is in the range of approximately 0 to 150 mV for each cell. With this configuration, for example, the maximum break-in voltage requirement for a 200-cell stack is ~30V. While $H_2$ is oxidized in the anode, equal amounts of $H_2$ is regenerated in the cathode through a hydrogen evolution reaction such that no net hydrogen is consumed. Evolved hydrogen from the cathode together with liquid water can be combined with anode exhaust in a water separator, where liquid water is separated and This recycled back to an anode inlet.

Attendant benefits for at least some of the disclosed concepts include MEA break-in with little or no net hydrogen consumption and relatively low total voltage and total current requirements (e.g., less than 50V at less than 80 A). Other resultant benefits may include a reduction in heat generation that helps to provide a low-temperature break-in process. Additional advantages may include reduced conditioning time and simplified, low-cost test equipment. By reducing voltage requirements, eliminating net hydrogen consumption, decreasing test equipment investment, and minimizing conditioning times, disclosed fuel cell stack break-in procedures help to reduce stack manufacturing costs, e.g., for in stack verification test or SVT.

Aspects of the present disclosure are directed to break-in procedures for conditioning each MEAs of a newly assembled fuel cell stack. Disclosed, for example, is a break-in method for conditioning a membrane assembly of a fuel cell stack. This membrane assembly includes an anode with an anode fluid inlet, a cathode with a cathode fluid inlet, and a proton conducting membrane disposed between the anode and the cathode. The method includes, in any order and in any combination with any of the disclosed features: commanding transmission of humidified hydrogen to the anode fluid inlet; commanding transmission of deionized water to the cathode fluid inlet; commanding application of an electric current and a voltage cycle across the fuel cell stack; and, commanding the fuel cell stack to operate in a hydrogen pumping mode until it is determined that the fuel cell stack operates at a predetermined threshold for a fuel cell stack voltage output capability. When operating in hydrogen pumping mode, the membrane assembly oxidizes the humidified hydrogen in the anode, transports protons from the anode to the cathode across the proton conducting membrane, and regenerates the hydrogen in the cathode through a hydrogen evolution reaction. Electric current may be applied in the form of a constant value, a square wave, and/or a triangle wave. Prior to transmitting humidified hydrogen to the anode and deionized water to the cathode, the method may include commanding transmission of humidified nitrogen to both the anode and cathode through respective fluid inlets.

Other aspects of the present disclosure are directed to motor vehicles with proton exchange membrane fuel cells (PEMFC) conditioned in accordance with any of the disclosed break-in procedures. A "motor vehicle," as used herein, may include any relevant vehicle platform, such as passenger vehicles (fuel cell hybrid, fuel cell electric, fully or partially autonomous, etc.), commercial vehicles, industrial vehicles, tracked vehicles, off-road and all-terrain vehicles (ATV), farm equipment, boats, airplanes, etc. Membrane electrode assemblies conditioned in accordance with disclosed break-in procedures can be employed in other applications, such as portable fuel cell devices, e.g., for powering residential and commercial devices, and stationary fuel cell power plants, e.g., designed to provide a clean, reliable source of power to airports, hospitals, schools, banks, and homes.

Additional aspects of this disclosure are directed to fuel cell conditioning systems for completing break-in of each MEA in a newly assembled fuel cell stack. As an example, a fuel cell conditioning system is presented for implementing break-in of a membrane assembly of a fuel cell. The fuel cell conditioning system includes a first intake conduit/hose that connects the anode of the membrane assembly to a hydrogen source, and a second intake conduit/hose that connects the cathode of the membrane assembly to a water source. Also included in the fuel cell conditioning system is an electrical connector/cable that connects the fuel cell stack to an electric power source. The fuel cell conditioning system may also include a water separator, a first exhaust conduit/hose that connects the anode to the water separator, and a second exhaust conduit/hose that connects the cathode to the water separator.

An electronic control unit of the conditioning system is programmed to: command humidified hydrogen be transmitted from the hydrogen source through the first intake conduit to the anode fluid inlet; command deionized water be transmitted from the water source through the second intake conduit to the cathode fluid inlet; command application of an electric current and voltage cycle to the fuel cell stack via the electrical connector; and, operate the fuel cell stack in a hydrogen pumping mode whereby the membrane assembly transports protons from the anode to the cathode across the proton conducting membrane until the fuel cell stack is determined to operate at a predetermined threshold for a fuel cell stack voltage output capability.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION

This disclosure is susceptible of embodiment in many different forms. There are shown in the drawings and will herein be described in detail representative embodiments of the disclosure with the understanding that these representative embodiments are to be considered an exemplification of the principles of the disclosure and are not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Figure 1:
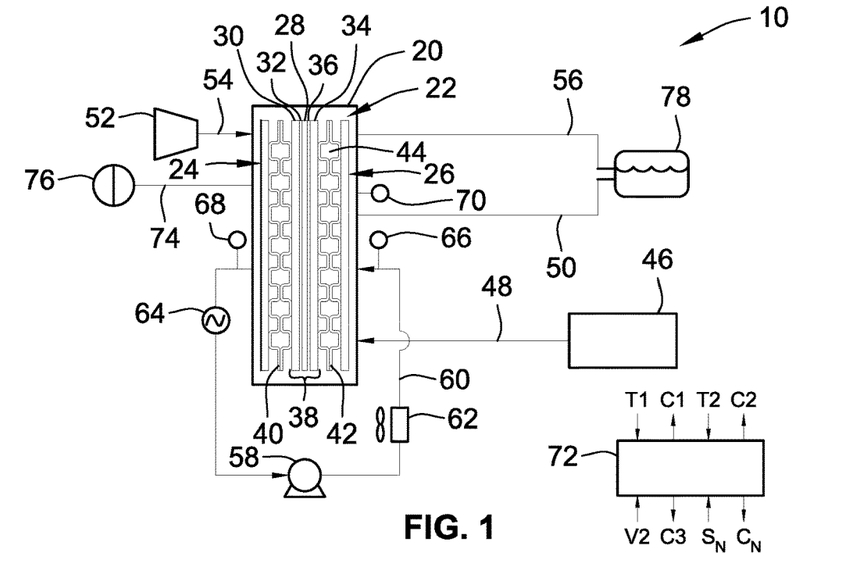
FIG. 1 is a schematic diagram of a representative fuel cell conditioning system for break-in of a fuel cell stack in accordance with aspects of the present disclosure.

Referring now to the drawings, wherein like reference numbers refer to like features throughout the several views, there is shown in FIG. 1 a schematic illustration of a representative fuel cell conditioning system, designated generally at 10, for break-in of a fuel cell stack 20. The illustrated fuel cell conditioning system 10 is merely an exemplary application with which the novel aspects and features of this disclosure may be practiced. In the same vein, implementation of the present concepts for break-in of a proton exchange membrane fuel cell stack 20 should also be appreciated as an exemplary application of the novel concepts disclosed herein. As such, it will be understood that many aspects and features of the present disclosure may be applied to other fuel cell stack configurations, and implemented by other conditioning system architectures. Lastly, the drawings presented herein are not necessarily to scale and are provided purely for instructional purposes. Thus, the specific and relative dimensions shown in the drawings are not to be construed as limiting.

With continuing reference to FIG. 1, the fuel cell stack 20 is composed of multiple fuel cells 22 of the PEM type that are mounted, e.g., in series with each other. In particular, each fuel cell 22 is, for example, a multi-layer construction with an anode side 24 and a cathode side 26 that are separated by a proton-conductive perfluorosulfonic acid membrane 28. An anode diffusion media layer 30 is provided on the anode side 24 of the PEMFC 22, with an anode catalyst layer 32 interposed between and operatively connecting the membrane 28 and corresponding diffusion media layer 30. Likewise, a cathode diffusion media layer 34 is provided on the cathode side 26 of the PEMFC 22, with a cathode catalyst layer 36 interposed between and operatively connecting the membrane 28 and corresponding diffusion media layer 34. These two catalyst layers 32 and 36 cooperate with the membrane 28 to define, in whole or in part, an MEA 38. The diffusion media layers 30 and 34 are porous constructions that provide for fluid inlet transport to and fluid exhaust transport from the MEA 38. An anode flow field plate (or "bipolar plate") 40 is provided on the anode side 24 in abutting relation to the anode diffusion media layer 30. In the same vein, a cathode flow field plate (or "bipolar plate") 42 is provided on the cathode side 26 in abutting relation to the cathode diffusion media layer 34. Coolant flow channels 44 traverse each of the bipolar plates 40 and 42 to allow cooling fluid to flow through the fuel cell 22. Respective fluid inlet ports and manifolds direct hydrogen fuel and oxidant to passages in the anode and cathode flow field plates.

FIG. 1 presents a simplified block diagram of a fuel cell conditioning system 10 for break-in of a fuel cell stack 20. The illustrated fuel cell conditioning system 10 may generally represent any type of conditioning system and/or testing environment capable of stack incubation for break-in. Only select components of the conditioning system 10 have been shown by way of example in the drawings and will be described in detail herein. Nevertheless, the conditioning system 10 can include numerous additional and alternative features, and other well-known peripheral components, without departing from the intended scope of this disclosure. By way of example, and not limitation, hydrogen ($H_2$) and/or nitrogen ($N_2$) inlet flow—be it gaseous, concentrated, entrained or otherwise—is transmitted from a hydrogen/nitrogen source 46 to the anode side 24 of the fuel cell stack 20 via (first) fluid intake conduit or hose 48. Anode exhaust exits the stack 20 via (first) fluid exhaust conduit or hose 50. A compressor or pump 52 provides a cathode inlet flow, e.g., of deionized water (DI $H_2O$) and/or nitrogen ($N_2$), via a (second) fluid intake line or manifold 54 to the cathode side 26 of the stack 20. Cathode exhaust is output from the stack 20 via a (second) fluid exhaust conduit or manifold 56. Flow control valves, flow restrictions, filters, and other known devices for regulating fluid flow can be implemented by the system 10 of FIG. 1.

Fuel cell conditioning system 10 of FIG. 1 may also include a thermal sub-system operable for controlling the temperature of the fuel cell stack 42 during preconditioning, break-in and post-conditioning. According to the illustrated example, a cooling fluid pump 58 pumps a cooling fluid through a coolant loop 60 to the fuel cell stack 20 and into the coolant channels 44 in each cell 22. A radiator 62 and a heater 64 fluidly coupled in the coolant loop 60 are used to maintain the stack 20 at a desired temperature. The conditioning system 10 is equipped with various sensing devices for monitoring system operation and progress of fuel cell break-in. For instance, a (first) temperature sensor 66 measures, monitors or otherwise detects a temperature value of the coolant at a coolant inlet to the fuel cell stack 20, and a (second) temperature sensor 68 measures, monitors or otherwise detects a temperature value of the coolant at a coolant outlet of the stack 20. An electrical connector or cable 74 connects the fuel cell stack 20 to an electric power supply 76. A voltage/current sensor 70 is operable to measure, monitor or otherwise detect fuel cell voltage and/or current across the fuel cells 22 in the stack 20 during break-in operation.

Programmable electronic control unit (ECU) 72 helps to control operation of the fuel cell conditioning system 10. As an example, ECU 72 receives one or more temperature signals T1 from the first temperature sensor 66 that indicates the temperature of the coolant at a coolant inlet of the fuel cell stack 20; ECU 72 may responsively issue one or more command signals C1 to modulate operation of the radiator 62. This ECU 72 also receives one or more temperature signals T2 from the temperature sensor 68 that indicates the coolant temperature at a coolant outlet of the stack 20; ECU 72 may responsively issue one or more command signals C2 to modulate operation of the heater 64. The ECU 72 may also receive one or more fuel cell voltage signals V2 from the voltage sensor 70, and responsively issues one or more command signals C3 to modulate current and voltage flow across the fuel cell stack 20. Additional sensor signals SN may be received by, and additional control commands CN may be issued from the ECU 72, e.g., to control the hydrogen/nitrogen source 46, the cathode inlet flow compressor/pump 52, the coolant pump 58, or any other sub-system illustrated and/or described herein. In so doing, ECU 72 can regulate the flow of hydrogen, nitrogen and water to the fuel cell stack. An exemplary algorithm executable by the ECU 72 for performing break-in for the MEAs in the stack 20 is discussed below in more detail. In FIG. 1, the arrows connecting ECU 72 with the various components of the system 10 are emblematic of electronic signals or other communication exchanges by which data and/or control commands are transmitted from one component to the other.

Figure 2:
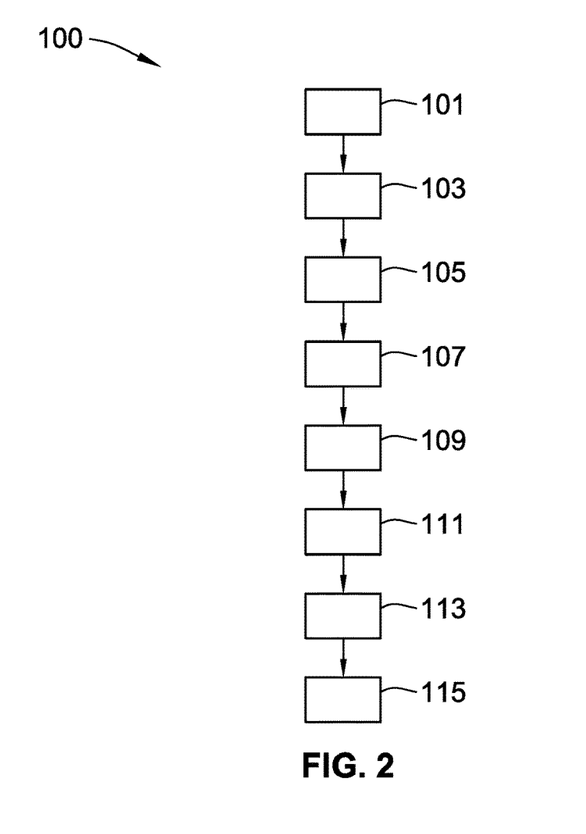
FIG. 2 is a flowchart for a representative fuel cell break-in procedure that can be executed, for example, by a control-logic circuit, a programmable electronic control unit, or other computer-based device in accord with aspects of the disclosed concepts.

With reference now to the flow chart of FIG. 2, an improved method or control strategy for operating a fuel cell conditioning system, such as conditioning system 10 of FIG. 1, for break-in of one or more fuel cells in a stack, such as cell 22 of stack 20 in FIG. 1, for example, is generally described at 100 in accordance with aspects of the present disclosure. Some or all of the operations illustrated in FIG. 2 and described in further detail below can be representative of an algorithm that corresponds to processor-executable instructions that can be stored, for example, in main or auxiliary memory, and executed, for example, by an ECU, a CPU, an on-board or remote control logic circuit, or other device, to perform any or all of the above and/or below described functions associated with the disclosed concepts.

The method begins at block 101 with connecting the appropriate anode and cathode fluid inlets and fluid outlets of the fuel cell stack 20 to the corresponding fluid intake conduits/hoses 48, 54 and fluid exhaust conduit/hoses 50, 56. Block 103 includes connecting the electrical connector/cable 74 to the fuel cell stack 20. These connections (and subsequent disconnections) may be performed manually and/or automatically, depending on the particular architecture of the fuel cell conditioning system. Block 103 may further include a launch prompt procedure for initiating a break-in incubation period for the operatively coupled fuel cell stack 20. Prior to, contemporaneous with, or after completion of blocks 101 and 103, the fuel cell stack 20 can be preheated, e.g., in the range of approximately 70-185° F. or, optionally, in the range of approximately 140-160° F. via the thermal sub-system of FIG. 1, as part of a preconditioning process prior to initiation of the break-in procedure. During break-in, however, it may be desirable, for at least some applications, to operate the fuel cell stack 20 at a temperature of approximately 60-80° F. or, for example, in the range of 65-75° F. or, in a more specific example, at room temperature.

The method 100 continues to block 105 with flowing an inert gas through the anode and cathode regions 24, 26 of the fuel cell stack 20 as part of a pre-conditioning process prior to incubation of the stack 20. This may include the ECU 72 emitting a command signal to transmit argon, helium, or nitrogen, or any combination thereof, from a complementary inert gas source to fluid inlets of the anode and cathode. It is also plausible, for at least some applications, for the fuel cell conditioning system 10 to employ two discrete gas sources each containing a distinct inert gas, one for the anode side 24 of the stack 20 and one for the cathode side 26 of the stack 20. This inert gas flow may be humidified, e.g., via water that is injected by the thermal subsystem 40 or via other known techniques for humidifying gas flows. Irrespective of whether or not the inert gas is humidified prior to receipt by the stack, the gas or gases that are fed to the fuel cell stack 20 do not cause electrochemical reactions to occur during preconditioning.

After completion of a designated preconditioning period, e.g., of approximately 20-30 minutes, during which the fuel cell stack 20 is prepped for break-in, the flow of inert gas to the anode side is discontinued and switched to humidified hydrogen gas ($H_2$) at block 107. This operation may comprise the ECU 72 generating a command signal instructing the hydrogen/nitrogen source 46 to transmit humidified hydrogen to the anode fluid inlet while contemporaneously ceasing transmission of nitrogen to the anode. In a similar regard, at block 109 the flow of inert gas to the cathode side of the stack is discontinued and switched to deionized water. Optional embodiments may require a flow of $N_2$ be maintained with an incoming feed of DI $H_2O$ for the cathode. This operation may comprise the ECU 72 generating a command signal instructing the compressor/pump 52 to transmit deionized water to the cathode fluid inlet while contemporaneously ceasing transmission of nitrogen to the cathode. Depending, for example, on the size and power output of the fuel cell stack, humidified hydrogen may be transmitted to the anode side of the stack at approximately 30 to 700 standard liters per minute (slpm) depending, for example, on current. Moreover, deionized water may be transmitted to the cathode side of the stack at approximately 5-20 milliliters per minute (mL/min) or, in at least some embodiments, approximately 8-12 mL/min or, optionally, approximately 10 mL/min. The break-in procedure may be completed with an absolute pressure of approximately 90-110 kilopascals (Kpaa) or, in at least some embodiments, approximately 105 Kpaa.

With continuing reference to FIG. 2, the fuel cell stack break-in procedure 100 continues to block 111 with employing a local or external power source, such as power supply 76 of FIG. 1, to apply current to each cell 22 in the stack 20 and, optionally, monitor the cell/stack voltage. Block 111 may comprise the ECU 72 generating an appropriate command signal for a dedicated microcontroller or other discrete IC device, which may be in the nature of an electronic Power Control Unit (PCU), to apply an electric current across the fuel cell stack. An appropriate electronic device, such as a multi-channel voltage and current meter and data logger, may be employed to selectively, systematically, or randomly sample and log voltage and current during cell break-in. The foregoing command signal may further require application of a voltage cycle to the fuel cell stack, with said cycle limited to a designated cycle range between a predetermined low potential and a predetermined high potential.

Figure 3:
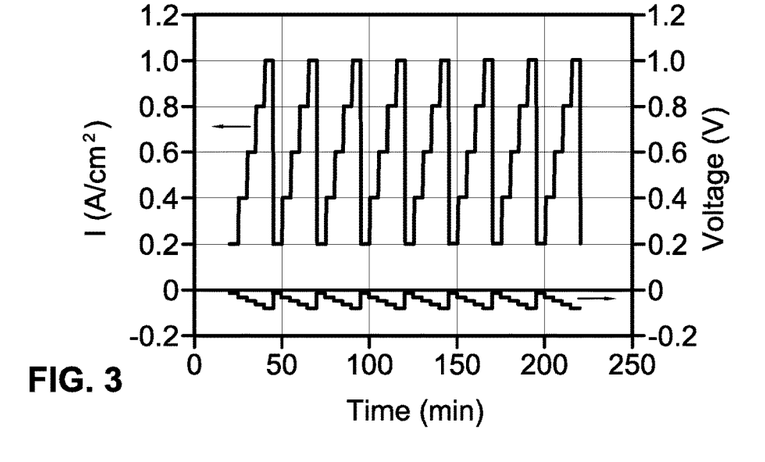
FIG. 3 is a graph illustrating representative $H_2$ pumping break-in current and voltage profiles in accordance with aspects of the present disclosure.

In a more specific, non-limiting example, method 100 may require a predetermined finite number of the voltage cycles, e.g., approximately 10 to 50 cycles or approximately 20 to 40 cycles, be applied across the stack with voltage cycling between a low potential, e.g., of approximately 0.05-0.1V and high potential, e.g., of approximately 0.9-1.2V and at a scan rate of approximately 5 mV/sec to 250 mV/sec. In a representative application, FIG. 3 illustrates a voltage-current profile for a representative hydrogen pumping operation. In a representative application, the voltage is cycled between 0.05 V and 1.2 V at a scan rate of 50 mV/sec. It is desirable, for at least some of the implementations, that the voltage cycling is conducted in blocks of approximately 20 to 48 cells to keep the total cell voltage lower than 50 V. The test will be conducted with $H_2$ flowing on the anode compartment and N2 in the cathode compartment.

At block 113 of FIG. 2, the break-in procedure 100 recycles and stores hydrogen generated by the cathode side 26 of the fuel cell stack 20 and, at block 115 of FIG. 2, completes the break-in process after a predefined number of cycles or a predefined duration. According to the example illustrated in FIG. 1, ECU 72 generates a command signal for the fuel cell stack 20 to operate in a "hydrogen pumping mode" until the fuel cell stack is determined to operate at a predetermined threshold for a fuel cell stack voltage output capability. When operating in hydrogen pumping mode, the MEA 38 oxidizes humidified hydrogen in the anode catalyst layer 32, transports protons across the proton-conductive perfluorosulfonic acid membrane 28, and regenerates the hydrogen on the cathode side 26 of the PEMFC 22 through a hydrogen evolution reaction. A hydrogen evolution reaction may be typified as the production of hydrogen gas ($H_2$) through a reduction of protons process. The evolution of hydrogen is generally based on the desorbing of molecules coming from the cathode surface. In a hydrogen evolution reaction (HER), e.g., with an acid electrolyte, hydrogen evolves from the reaction $2H^+ + 2e^- \rightarrow H2(g)$. The ECU 72 may then emit a command signal requiring evolved hydrogen and liquid $H_2O$ from the cathode side 26 be transported through fluid exhaust conduit or manifold 56 to a water separator 78 (FIG. 1) where hydrogen and water from the cathode are combined with depleted hydrogen exhausted from the anode side 24 through fluid exhaust conduit 50. ECU 72 may then command this water separator 78 to separate hydrogen from water, and recycle the separated hydrogen back to the anode fluid inlet.

Disclosed break-in procedures have numerous functions and advantages including, singly and in any combination: helping to remove residual impurities introduced during manufacture of the MEA and fuel cell stack; helping to activate catalyst metal reaction sites that otherwise cannot participate in the reaction; helping to ensure transfer paths of the reactants to the catalysts; and/or helping to ensure a proton transfer path by sufficiently hydrating the electrolyte contained in the electrolyte membrane and the electrodes. Disclosed incubation and break-in of a fuel cell may also: assist with acceleration of catalyst reaction kinetics, improve membrane hydration, improve electrical contact surface formation, and assist with triple phase boundary formation. Membrane hydration helps to improve conductivity of protons in which water molecules are present inside the pores of the membrane which, in turn, facilitates hydrogen ion transfer. Electrical contact surface formation helps to reduce electrical contact resistance. Triple phase boundary formation helps to accelerate the electrochemical reaction in each individual fuel cell.

Figure 4A:
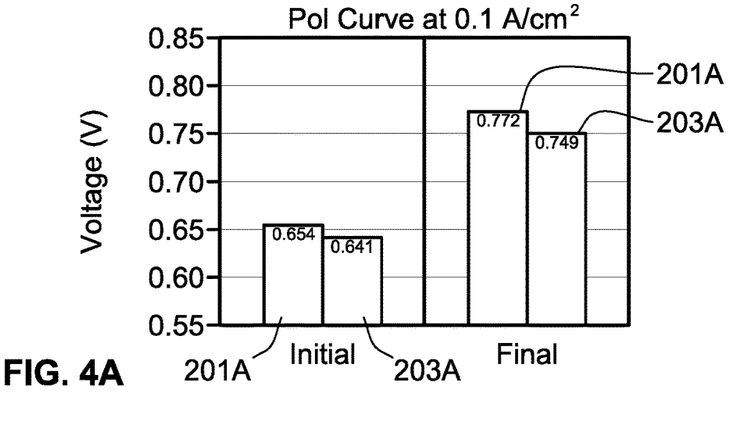
FIGS. 4A and 4B are charts comparing the conditioning effects of a conventional $H_2$/air load-cycling break-in operation and a representative $H_2$ pumping/water load-cycling break-in operation in accordance with aspects of the present disclosure.
Figure 4B:
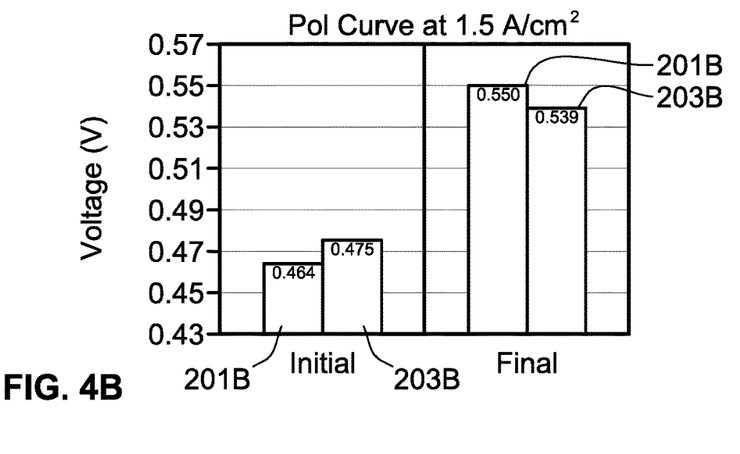

FIGS. 4A and 4B compare the conditioning effects of a conventional break-in procedure employing hydrogen (anode) and air (cathode) under load cycling conditions, designated at 201A in FIG. 4A and 201B in FIG. 4B, and a representative break-in procedure in accordance with this disclosure employing humidified $H_2$ (anode) and deionized water (cathode) with hydrogen pumping and load cycling, designated at 203A in FIG. 4A and 203B in FIG. 4B. In this representative example, $H_2$ pumping is performed for approximately 4 hours, while the load cycling time is approximately 55 minutes. This comparison helps to show that the disclosed break-in procedure provides approximately the same performance gain as conventional conditioning methods, at a significantly lower cost, e.g., with little or no net hydrogen consumption, low cell operation temperature, and relatively low total voltage and total current requirements.

Figure 5:
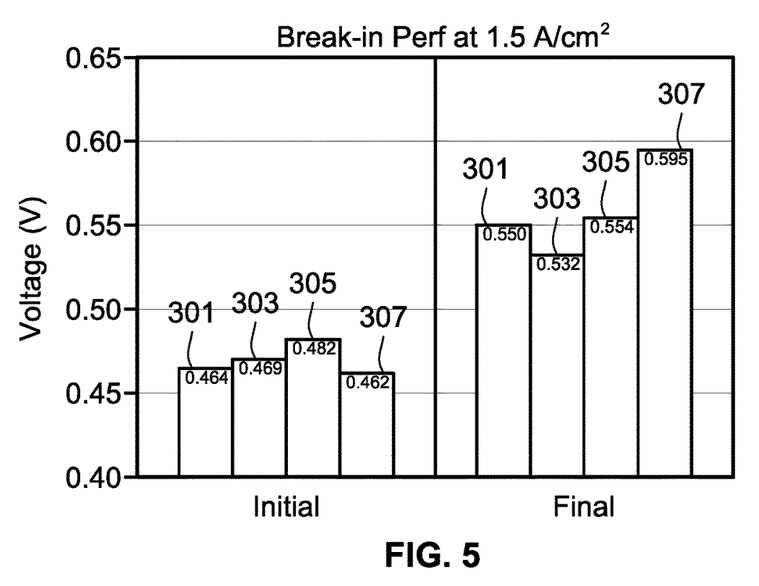
FIG. 5 is a chart illustrating representative impact of cathode CVs in between $H_2$ pumping on fuel cell break-in in accordance with aspects of the present disclosure.
Figure 6:
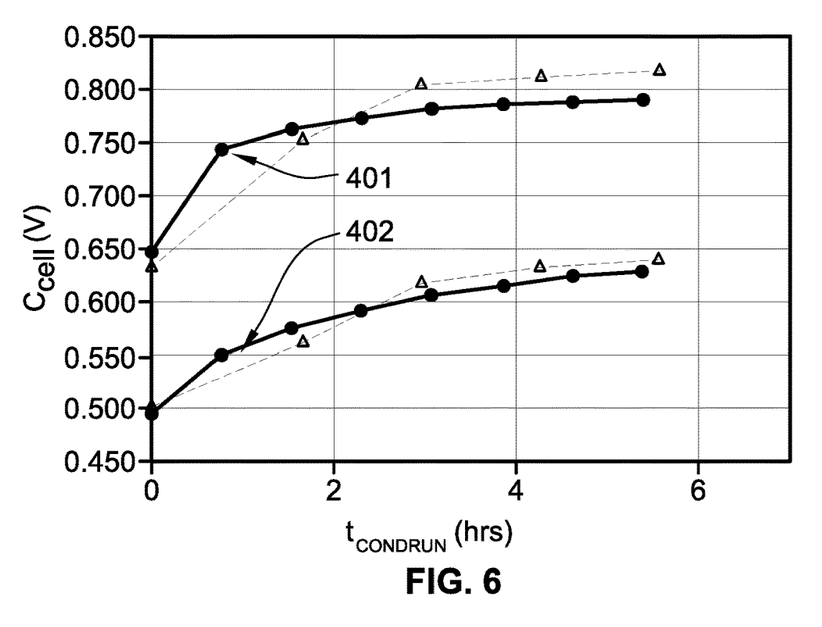
FIG. 6 is a graph illustrating representative break-in progress for hydrogen pumping operation at different amps per square cm ($A/cm^2$) with $N_2$ flow in cathode in accordance with aspects of the present disclosure.

FIG. 5 portrays the impact of cathode CVs (up to 1.2 V) between $H_2$ pumping on fuel cell break-in. In this example, conventional break-in with load cycles N=1 is shown at 301, break-in procedure with $H_2$ pumping N=3 is shown at 303, break-in procedure with $H_2$ pumping and cathode cyclic voltammetry (CV) with N=1 is shown at 305, and break-in procedure with H2 pumping and cathode 80° C. cyclic voltammetry (CV) with N=1 is shown at 307. FIG. 6 portrays examples of break-in progress for hydrogen pumping operations at different amps per square cm ($A/cm^2$) with $N_2$ flow in cathode. For instance, break-in progress with $H_2$ pumping at 80° C. with $N_2$ flow in the cathode for a low current density is shown at 401, and break-in progress with $H_2$ pumping at 80° C. with $N_2$ flow in the cathode for a high current density is shown at 402. Both 401 and 402 overlay a corresponding conventional break-in procedure without $H_2$ pumping. At t=0, there is no break-in.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and features.

What is claimed:

1. A break-in method for conditioning a membrane assembly of a fuel cell stack, the membrane assembly including a proton conducting membrane, an anode with an anode fluid inlet, and a cathode with a cathode fluid inlet, the method comprising:
    transmitting, from a hydrogen source through a first fluid intake conduit, humidified hydrogen to the anode fluid inlet;
    transmitting, from a water source through a second fluid intake conduit, deionized water to the cathode fluid inlet;
    commanding, via an electronic control unit, application of an electric current across the fuel cell stack; and
    operating the fuel cell stack in a hydrogen pumping mode whereby the membrane assembly transports hydrogen molecules from the anode to the cathode across the proton conducting membrane until the fuel cell stack is determined to operate at a predetermined threshold for a fuel cell stack voltage output capability.

2. The break-in method of claim 1, further comprising commanding application of a voltage cycle to the fuel cell stack in a range between a predetermined low potential and a predetermined high potential.

3. The break-in method of claim 2, wherein the commanding application of the voltage cycle includes commanding application of a predetermined finite number of the voltage cycles.

4. The break-in method of claim 3, wherein the predetermined low potential is approximately 0.1V, the predetermined high potential is approximately 0.9V, and the predetermined finite number of the voltage cycles is approximately 10 to 50 cycles.

5. The break-in method of claim 2, wherein a total current of the electric current applied across the fuel cell stack is less than or equal to approximately 80A, and wherein a total voltage of the voltage applied to the fuel cell stack is less than or equal to approximately 50V.

6. The break-in method of claim 1, wherein the commanding application of the electric current across the fuel cell stack includes imposing a positive current across each cell in the fuel cell stack in a range of approximately 0.05 to 1.5 A/cm$^2$.

7. The break-in method of claim 1, wherein the fuel cell stack operating in the hydrogen pumping mode further includes hydrogen oxidized in the anode being regenerated in the cathode through a hydrogen evolution reaction.

8. The break-in method of claim 7, further comprising transporting hydrogen and water from the cathode through a second fluid exhaust conduit to a water separator where the hydrogen and water from the cathode are combined with depleted hydrogen exhausted through a first fluid exhaust conduit from the anode.

9. The break-in method of claim 8, further comprising commanding the water separator to separate hydrogen from water and transmit the separated hydrogen to the anode fluid inlet.

10. The break-in method of claim 1, wherein the fuel cell stack is operated in the hydrogen pumping mode at a temperature of approximately 70-80° F.

11. The break-in method of claim 1, further comprising, prior to the transmission of humidified hydrogen and the transmission of deionized water, transmitting humidified nitrogen from an inert gas source to both the anode fluid inlet and the cathode fluid inlet.

12. The break-in method of claim 1, wherein the transmission of deionized water includes transmitting humidified nitrogen or humidified hydrogen to the cathode fluid inlet.

13. The break-in method of claim 1, wherein the humidified hydrogen is transmitted at approximately 30-700 standard litres per minute (slpm), and the deionized water is transmitted at approximately 5-20 mL/min.

14. The break-in method of claim 1, wherein the electric current is applied in the form of a constant value, a square wave, or a triangle wave, or any combination thereof.

15. A fuel cell conditioning system for implementing break-in of a membrane assembly of a fuel cell stack, the membrane assembly including a proton conducting membrane, an anode with an anode fluid inlet and an anode fluid outlet, and a cathode with a cathode fluid inlet and a cathode fluid outlet, the fuel cell conditioning system comprising:
    a first intake conduit configured to connect the anode fluid inlet to a hydrogen source;
    a second intake conduit configured to connect the cathode fluid inlet to a water source;
    an electrical connector configured to connect the fuel cell stack to an electric power source; and
    an electronic control unit programmed to:
        command transmission of humidified hydrogen from the hydrogen source through the first intake conduit to the anode fluid inlet;
        command transmission of deionized water from the water source through the second intake conduit to the cathode fluid inlet;
        command application of an electric current through the electrical connector to the fuel cell stack; and
        command the fuel cell stack to operate in a hydrogen pumping mode whereby the membrane assembly transports protons from the anode to the cathode across the proton conducting membrane until the fuel cell stack is determined to operate at a predetermined threshold for a fuel cell stack voltage output capability.

16. The fuel cell conditioning system of claim 15, wherein the electronic control unit is further programmed to command application of a predetermined finite number of voltage cycles to the fuel cell stack in a range between a predetermined low potential and a predetermined high potential, wherein the voltage cycles are applied contemporaneous with the fuel cell stack operating in the hydrogen pumping mode.

17. The fuel cell conditioning system of claim 15, wherein the fuel cell stack operating in the hydrogen pumping mode further includes hydrogen oxidized in the anode being regenerated in the cathode through a hydrogen evolution reaction.

18. The fuel cell conditioning system of claim 15, further comprising:
    a water separator;
    a first exhaust conduit configured to connect the anode fluid outlet to the water separator; and
    a second exhaust conduit configured to connect the cathode fluid outlet to the water separator,
    wherein the electronic control unit is further programmed to command transport of hydrogen and water from the cathode to the water separator, and command transport of depleted hydrogen from the anode to the water separator.

19. The fuel cell conditioning system of claim 18, wherein the electronic control unit is further programmed to command the water separator to separate hydrogen from water and transmit the separated hydrogen to the anode fluid inlet.

20. The fuel cell conditioning system of claim 15, wherein the electronic control unit is further programmed to, prior to the transmission of humidified hydrogen to the anode and the transmission of deionized water to the cathode, command transmission of humidified nitrogen to both the anode fluid inlet and the cathode fluid inlet.

* * * * *